US009069890B2

(12) United States Patent
Kaiser et al.

(10) Patent No.: US 9,069,890 B2
(45) Date of Patent: Jun. 30, 2015

(54) RANKING OF COMPUTING EQUIPMENT CONFIGURATIONS FOR SATISFYING REQUIREMENTS OF VIRTUALIZED COMPUTING ENVIRONMENTS BASED ON AN OVERALL PERFORMANCE EFFICIENCY

(75) Inventors: Shawn Kaiser, Gardner, KS (US); Doron Chosnek, Bellaire, TX (US)

(73) Assignee: Cisco Technology, Inc., San Jose, CA (US)

(*) Notice: Subject to any disclaimer, the term of this patent is extended or adjusted under 35 U.S.C. 154(b) by 341 days.

(21) Appl. No.: 13/090,447

(22) Filed: Apr. 20, 2011

(65) Prior Publication Data
US 2012/0272234 A1 Oct. 25, 2012

(51) Int. Cl.
*G06F 9/455* (2006.01)
*G06F 11/34* (2006.01)

(52) U.S. Cl.
CPC ........ *G06F 11/3442* (2013.01); *G06F 9/45541* (2013.01); *G06F 11/3428* (2013.01); *G06F 2201/815* (2013.01)

(58) Field of Classification Search
CPC . G06F 9/455; G06F 9/45541; G06F 11/3447; G06F 11/3452
USPC ......... 718/1, 100, 102, 104; 709/223; 703/22; 711/70
See application file for complete search history.

(56) References Cited

U.S. PATENT DOCUMENTS

| 7,577,722 | B1* | 8/2009 | Khandekar et al. ........... 709/220 |
| 8,156,477 | B2* | 4/2012 | Rozenfeld .................... 717/127 |
| 8,209,687 | B2* | 6/2012 | Yuyitung et al. ................ 718/1 |
| 8,261,266 | B2* | 9/2012 | Pike et al. ....................... 718/1 |
| 8,261,268 | B1* | 9/2012 | Forgette ........................... 718/1 |
| 8,296,434 | B1* | 10/2012 | Miller et al. ................... 709/224 |
| 8,341,629 | B2* | 12/2012 | Williams et al. ................. 718/1 |
| 2005/0038800 | A1* | 2/2005 | Chidambaran et al. ....... 707/100 |
| 2007/0250829 | A1* | 10/2007 | Hillier et al. .................. 717/170 |
| 2007/0271560 | A1* | 11/2007 | Wahlert et al. ................... 718/1 |
| 2010/0077391 | A1* | 3/2010 | Domsch et al. .................. 718/1 |
| 2010/0198960 | A1* | 8/2010 | Kirschnick et al. ........... 709/224 |
| 2010/0199130 | A1* | 8/2010 | Rolia et al. ...................... 714/37 |
| 2010/0269109 | A1* | 10/2010 | Cartales ........................... 718/1 |
| 2012/0072762 | A1* | 3/2012 | Atchison et al. ................. 714/2 |
| 2012/0167083 | A1* | 6/2012 | Suit ................................... 718/1 |
| 2014/0040656 | A1* | 2/2014 | Ho et al. ........................... 714/3 |

OTHER PUBLICATIONS

Microsoft Tech Net, "How Virtual Manager Machine Rates Hosts", Sep. 11, 2009, pp. 1-5.
Microsoft TechNet, "How to Set Placement Defaults for Virtual Machines", Jul. 8, 2010, pp. 1-2.
Cisco, Solution Overview, "Cisco Desktop Virtualization Solutions: Providing Scalable, Secure, Cost-Effective Access to Server-Hosted Virtual Desktops", 2010, pp. 1-13.
vmware, Knowledge Base, "Calculating the Priority Level of a VMware DRS Migration Recommendation", KB Article: 1007485, Jan. 27, 2011, pp. 1-2.

* cited by examiner

*Primary Examiner* — Meng An
*Assistant Examiner* — Abu Ghaffari
(74) *Attorney, Agent, or Firm* — Edell, Shapiro & Finnan, LLC (57) ABSTRACT

Performance test data of a plurality of virtualization computing equipment configurations is collected and stored for each of a plurality of virtualization computing performance categories. At a computing device, data is received that describes requirements for virtualization computing services. Virtualization computing equipment configurations among the plurality of virtualization computing equipment configurations are identified that are capable of satisfying the requirements. For each identified virtualization computing equipment configuration, a measure of efficiency is determined for each of the plurality of performance categories based on the requirements and the virtualization computing performance test data. From the efficiency measure computed for the plurality of performance categories, a score is generated that represents the overall performance efficiency for each identified virtualization computing equipment configuration.

16 Claims, 10 Drawing Sheets

| VM/Server | VM/Core | MHz per VM | CMT/VM | GB per VM | Pwr/VM | Cost/VM | Watermarks | Score |
|---|---|---|---|---|---|---|---|---|
| 40 | 6 | 224 | 2.128 | 1.00 | 0.00 | 0.00 | Low Red | Lowest |
| 60 | 8 | 262 | 2.493 | 1.25 | 0 | 0 | Low Orange | Still Lower |
| 80 | 10 | 300 | 2.85 | 1.50 | 0.00 | 0.00 | Low Yellow | Lower |
| 80<=X<=140 | 10<=X<=11 | 300<=X<=1000000 | 2.85<=X<=1000000 | 1.5<=X<=2.5 | 0<=X<=2.5 | 0<=X<=27 | Green (Best) | Maximum |
| 140 | 11 | 1.00E+06 | 1.00E+06 | 2.50 | 2.50 | 27.00 | Hi Yellow | Lower |
| 150 | 12.5 | 1000000 | 1000000 | 2.75 | 3 | 50 | Hi Orange | Still Lower |
| 160 | 14 | 1000000 | 1000000 | 3.00 | 4.00 | 75.00 | Hi Red | Lowest |

| WEIGHT | 12% | 10% | 11% | 4% | 4% | 12% | 21% | 11% | 15% | |
|---|---|---|---|---|---|---|---|---|---|---|
| CONFIG NAME | VM/SERVER | VM/CORE | MHz/VM | CINT/VM | CFP/VM | BLEND/VM | GB/VM | WATTS/VM | COST/VM | RANK |
| VENDOR 1-A | 208 | 26 | 133 | 1.747 | 1.195 | 1.471 | 2.03 | 1.25 | $15.96 | 69.0 |
| VENDOR 1-B | 208 | 17 | 169 | 1.709 | 1.157 | 1.433 | 2.03 | 0.91 | $13.82 | 72.5 |
| VENDOR 1-C | 208 | 17 | 153 | 1.661 | 1.152 | 1.406 | 2.03 | 0.91 | $9.56 | 71.4 |
| VENDOR 1-D | 104 | 13 | 266 | 3.494 | 2.390 | 2.942 | 2.03 | 2.50 | $31.93 | 92.1 |
| VENDOR 2-A | 104 | 9 | 338 | 3.418 | 2.314 | 2.866 | 2.03 | 1.82 | $27.65 | 93.3 |
| VENDOR 2-B | 104 | 9 | 306 | 3.322 | 2.304 | 2.813 | 2.03 | 1.82 | $19.12 | 93.4 |
| VENDOR 2-C | 52 | 4 | 675 | 6.835 | 4.627 | 5.731 | 2.03 | 3.65 | $55.30 | 78.7 |
| VENDOR 3-A | 52 | 4 | 613 | 6.643 | 4.608 | 5.626 | 2.03 | 3.65 | $38.25 | 80.6 |
| VENDOR 3-B | 139 | 9 | 214 | 1.678 | 2.052 | 1.865 | 2.03 | 2.74 | $24.65 | 83.1 |
| VENDOR 3-C | 139 | 4 | 521 | 5.558 | 4.090 | 4.824 | 2.03 | 3.74 | $110.53 | 74.9 |
| VENDOR 1 CUSTOM | 278 | 56 | 100 | 0.198 | 0.198 | 0.198 | 2.20 | 2.00 | $20.00 | 9.2 |

RANKING OF COMPUTING EQUIPMENT CONFIGURATIONS FOR SATISFYING REQUIREMENTS OF VIRTUALIZED COMPUTING ENVIRONMENTS BASED ON AN OVERALL PERFORMANCE EFFICIENCY

TECHNICAL FIELD

The present disclosure relates to virtualized computing environments.

BACKGROUND

Virtualized computing environments use computing equipment that is configured to serve multiple users. For example, in a virtual desktop computing environment, multiple users can run any number of applications on top of an operating system and the computing equipment needs to be capable of supporting such operations. Selecting an appropriate computing equipment configuration for a virtualized computing environment is challenging because there are numerous variables associated with physical server capabilities, individual hardware vendor testing scenarios, individual software vendor testing scenarios, etc. It is difficult to make a comparison between equipment configurations in order to determine whether a particular configuration is well suited for a set of virtualized computing environment requirements.

DESCRIPTION OF EXAMPLE EMBODIMENTS

Overview

Techniques are provided herein to facilitate the selection of computing equipment used for a virtualized computing environment. These techniques allow for comparing computing equipment configurations and to rank/score computing equipment configurations in order to determine which configuration is best suited for a particular set of virtualized computing environment requirements. Virtualization computing performance test data of a plurality of virtualization computing equipment configurations is collected and stored for each of a plurality of performance categories. At a computing device, data is received that describes requirements for virtualization computing services. Virtualization computing equipment configurations among the plurality of virtualization computing equipment configurations are identified that are capable of satisfying the requirements. For each identified virtualization computing equipment configuration, a measure of efficiency is determined for each of the plurality of performance categories based on the requirements and the virtualization computing performance test data. From the efficiency measure computed for the plurality of performance categories, a score is generated that represents the overall performance efficiency for each identified virtualization computing equipment configuration.

Example Embodiments

Figure 1:
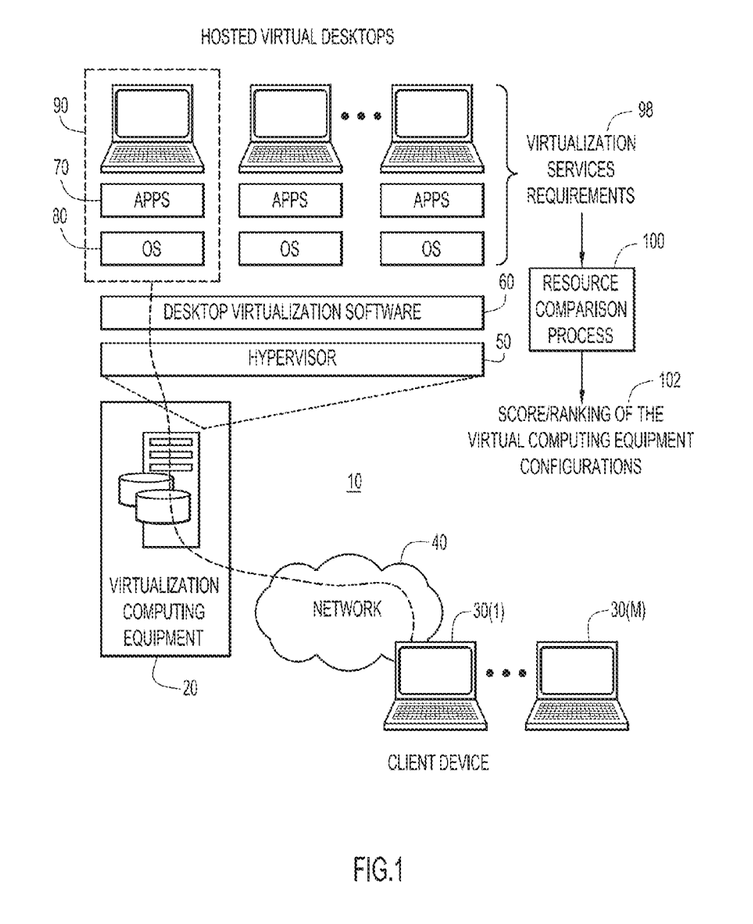
FIG. 1 is a block diagram illustrating a virtualized computing environment for which virtualization computing equipment configurations are evaluated by a resource comparison process.

Referring first to FIG. 1, a diagram is shown of a virtualized computing environment 10 comprising virtualization computing equipment 20 configured to serve a plurality of users, also called virtual desktop users, at corresponding client devices 30(1)-30(M) over a network 40. In one example, the virtualized computing environment is a virtual desktop computing environment that employs an underlying operating system and applications that operate on top of the operating system. In another example, the virtualized computing environment does not employ an underlying operating system.

The virtualization computing equipment 20 includes physical server computers, data storage devices (e.g., storage arrays) and related power supply and network interface equipment (e.g., switches). For purposes of the examples described herein, the computing equipment configuration includes one or more physical server computers. FIG. 1 also shows that in one type of virtualized computing environment 10, there are hypervisor software 50, desktop virtualization software 60 and a plurality of application (Apps) 70 that are executed on top of an operating system (OS) 80 for each of a plurality of user instances 90. Each user instance may be running a different type and number of applications at any given time. The hypervisor software 50 and desktop virtualization software 60 are configured to manage the use of the resources of the virtualization computing equipment 20 by the respective user instances 90.

When deciding to invest in a virtualized computing environment, such as the one shown in FIG. 1, the capabilities of virtualization computing equipment from multiple vendors can be considered. However, it is very difficult to accurately assess and compare the capabilities and real performance data associated with the different types of virtualization computing equipment available. Accordingly, a resource comparison process 100 is provided that is configured to automatically compute a weighted score for each of a plurality of virtualization computing equipment configurations, and to rank the configurations 102 based on their scores. This allows for a much faster and more accurate comparison of computing equipment configurations for a particular set of requirements 98.

While FIG. 1 shows virtual desktop users for which the virtualized computing services are provided, this is only an example. Instead of virtual desktop users, the virtualization computing equipment to be evaluated may be for a virtualized computing environment for virtual servers that can be supported by the virtualization computing equipment, not necessarily for virtual desktop applications but for any virtual computing service application.

Figure 2:
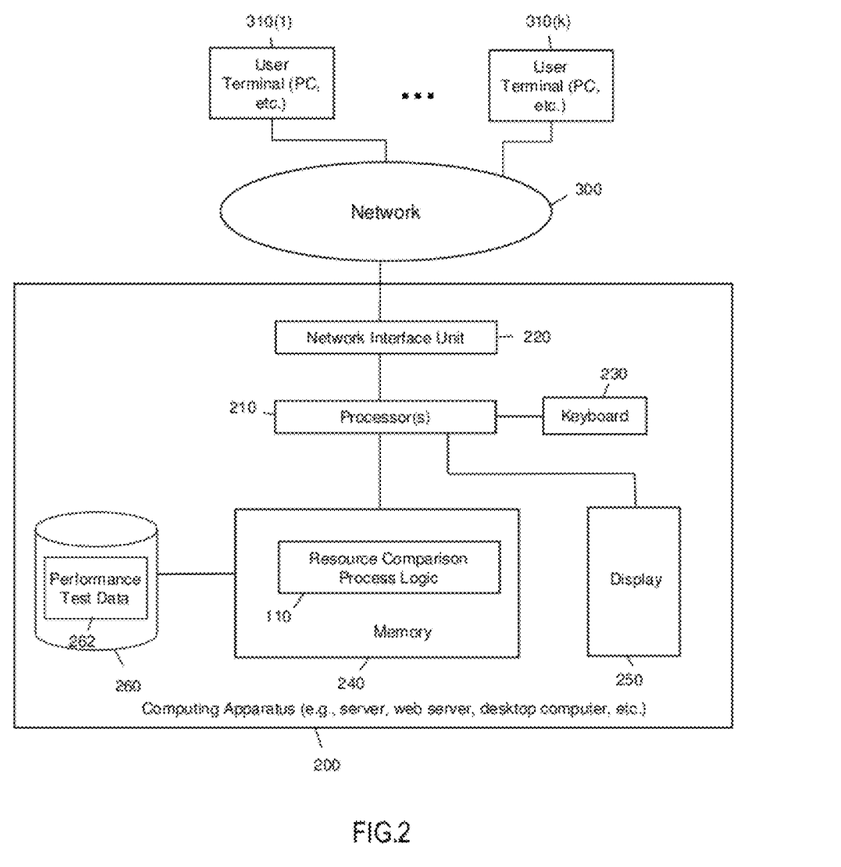
FIG. 2 is a block diagram of a computing apparatus that performs the resource comparison process for local users or remote users.

Turning now to FIG. 2, an example is shown of a computing apparatus 200 that is configured to execute the resource comparison process 100. The computing apparatus 200 comprises one or more processors 210, a network interface unit 220 (e.g., Ethernet switch or network card device), a keyboard 230, a memory 240, a display 250 and a data storage unit 260 that stores performance test data 262. The computing apparatus 200 may be accessible remotely via network 300 (e.g., the Internet) from one or more user terminals 310(1)-310(k). The user terminals 310(1)-310(k) may be any device capable of network connectivity, data input and data presentation (display) including a desktop computer, laptop computer, and hand-held computing device (e.g., tablet computer or Smartphone).

The resource comparison process logic 110 comprises software instructions that are executed by the processor(s) 210 to perform the resource comparison process 100 described herein. The operations of the resource comparison process logic 110 are described hereinafter in connection with the flow chart of FIG. 4, and the diagrams shown in FIGS. 5-7. The data storage unit 260 is, for example, a disk drive, storage array, etc., to store performance test data 262. Alternatively, depending on the volume of the performance test data 262, it may be stored in the memory 240, obviating the need for a data storage unit separate from the memory 240. The performance test data 262 comprises data representing performance test data of virtualization computing equipment of a plurality of vendors for each of a plurality of performance categories. The performance test data is collected from actual performance tests of each of a plurality of computing equipment configurations across the plurality of performance categories.

The operations of the resource comparison process logic 110 may be accessed locally at the computing apparatus 200 by way of the keyboard 230 and display 250. In another form, the operations of the resource comparison process logic 110 may be accessed remotely via the network 40 from one of the user terminals 310(1)-310(k). Thus, the computing apparatus 200 may take the form of a server computer, web server computer, desktop computer, laptop computer, etc.).

The memory 240 may include read only memory (ROM), random access memory (RAM), magnetic disk storage media devices, optical storage media devices, flash memory devices, electrical, optical, or other physical/tangible memory storage devices. In general, these memory devices may comprise one or more computer readable storage media encoded with software comprising computer executable instructions and when the software is executed, the processor that executes that software (e.g., processor 210) is operable to perform the operations described herein for the resource comparison process logic 110.

Figure 3:
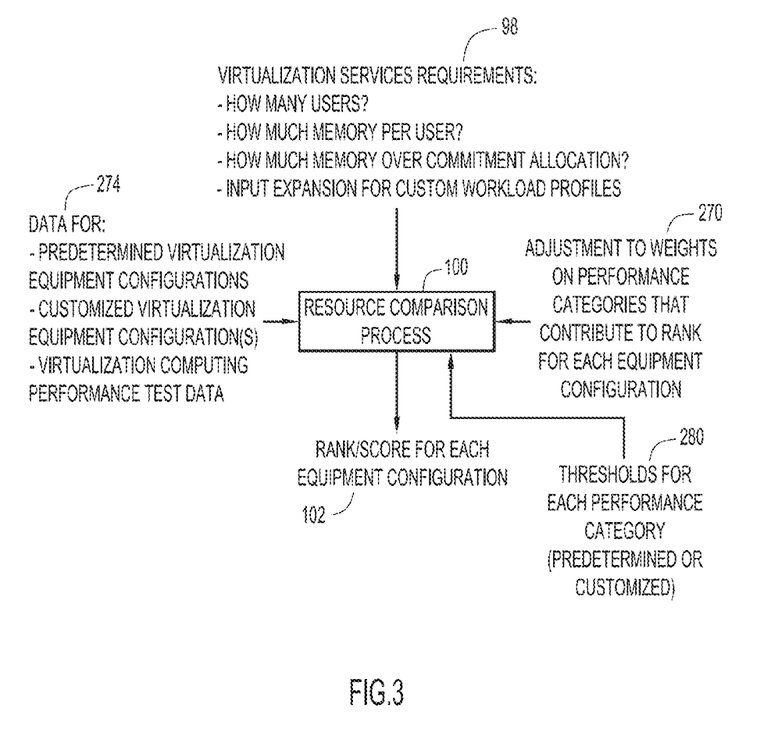
FIG. 3 is a diagram that generally depicts the operations of the resource comparison process.

Turning now to FIG. 3, a diagram is shown that generally depicts the operations of the resource comparison process 100. The primary inputs to the resource comparison process 100 include an indication of the total number of instances (e.g., virtual desktop users or virtual servers) to be used in a particular virtualization environment (and thus the total number of virtual machines required), amount of memory needed for each instance (e.g., virtual desktop user), percentage of expected memory over-commitment to be allocated, and input explanation for any customer workload profiles, collectively referred to as 98. Memory over-commit (or over-commitment) is a hypervisor feature that allows a virtual machine (VM) to use more memory space than the physical host has available. In actual practice, however, over-commitment of server computing resources is harmless because most virtual machines use only a small portion of the physical memory that is allocated to them. Some hypervisors can identify idle memory and dynamically reallocate unused memory from some virtual machines to others that need more memory.

The resource comparison process 100 also uses stored data 274 for predetermined configurations of virtualization equipment configurations (across a plurality of virtualization equipment vendors, for example) and one or more custom virtualization equipment configurations, as well as performance test data. The custom equipment configurations may be generated prior to running of the process 100 or even "on the fly" using data derived from one or more existing predetermined configurations. The virtualization computing performance test data comprises real/actual test results obtained from observing performance in each of the performance categories for each of the plurality of equipment configurations (including any custom virtualization computing equipment configuration). These test results may include data from a variety of sources to which vendors report performance data, including, for example, SPEC.org, VMware's VMmark™ benchmarking tool, Cisco Validated Designs, and other third party sources of performance and capacity testing. The resource comparison process 100 also receives data specifying thresholds 280 or watermarks (high, low and multiple high and low values for different ranges) for each performance category from which a performance efficiency measure is derived, as well as controls for adjustment to weights 270 on performance categories that contribute to the overall score for a virtualization equipment configuration. The weights may be fixed/predetermined default values or they may be adjusted/customized by a user as explained further hereinafter. The output of the resource comparison process 100 is a score (and a relative rank) 102 for each equipment configuration. The thresholds 280 may be fixed/predetermined values or they may be customized by a user for a particular evaluation session.

Figure 4:
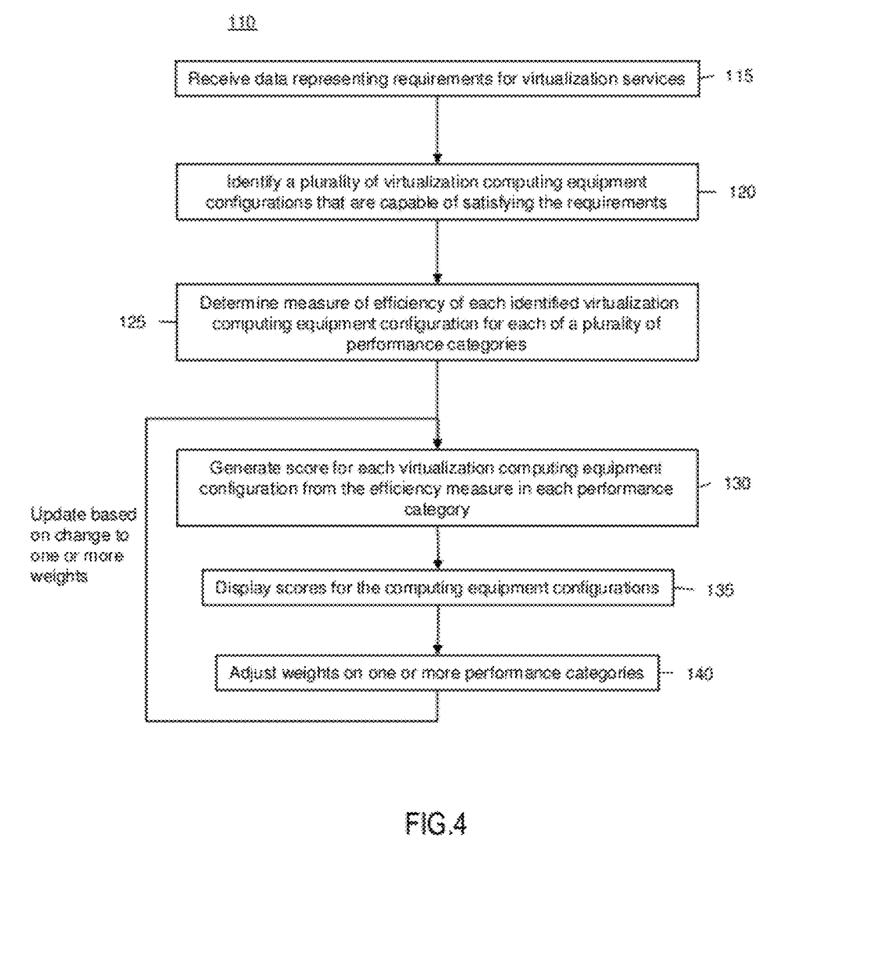
FIG. 4 is an example of a flow chart that depicts the operations of the resource comparison process.
Figure 5:
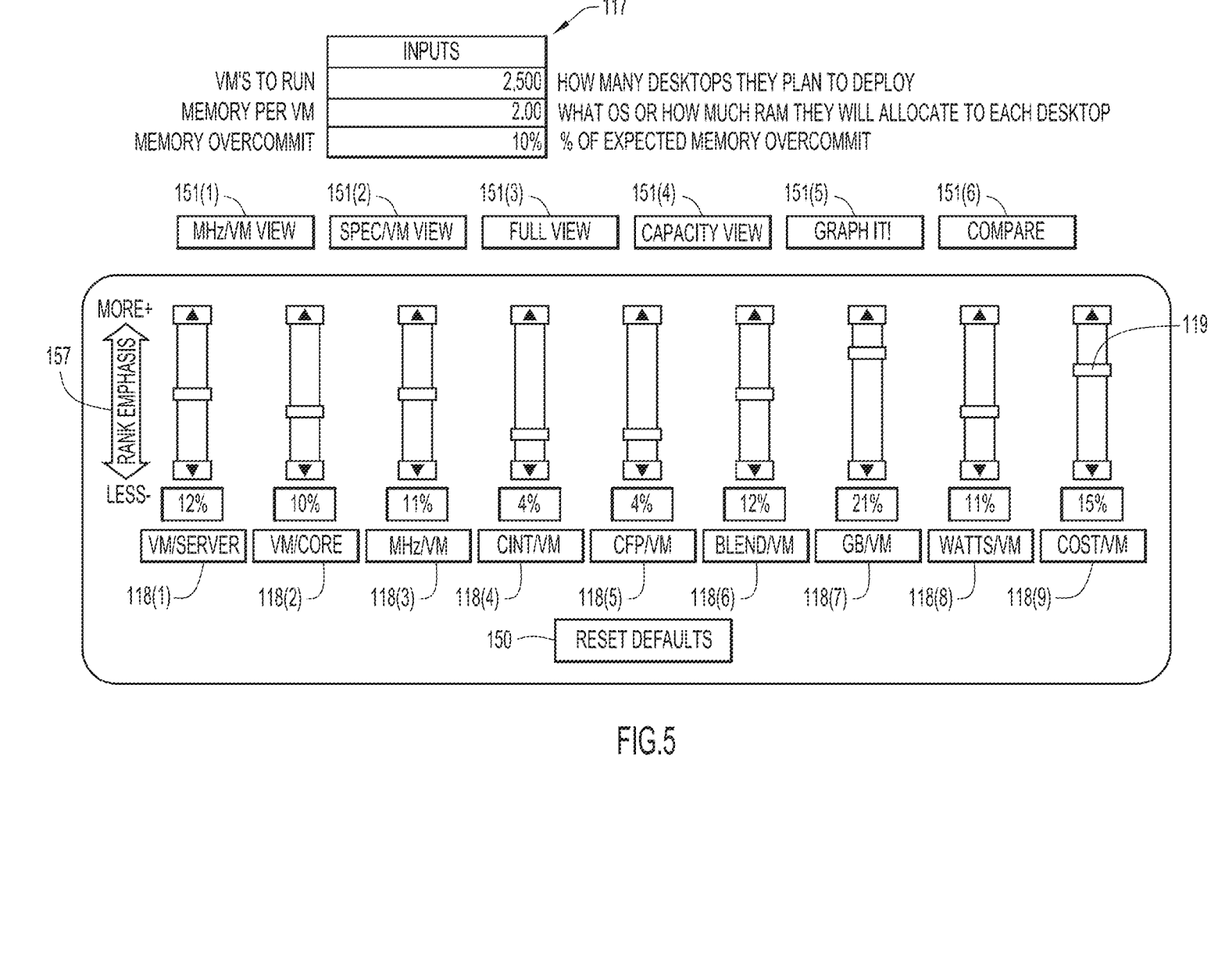
FIG. 5 is a diagram that depicts an example of a user input screen to enter virtualization service requirements and to adjust weights for performance categories.

Reference is now made to FIG. 4, together with FIGS. 5-7, 8A and 8B, for a more detailed description of the operations of the resource comparison process logic 110 that carries out the resource comparison process 100. It is also helpful to refer to FIG. 2 in connection with the following description of FIG. 4. As a precursor to the operations of the resource comparison process logic 110, the virtualization computing performance test data is obtained, collected and stored, as well as the data describing the plurality of equipment configurations. At 115, data describing requirements 98 for virtualization computing services is received, e.g., either locally at the computing apparatus 200 via keyboard 230 or remotely from one of the user terminals 310(1)-310(k). This is the data that represents, for example, the number of users, how much memory to be allocated for each user, and how much memory over-commitment to be allocated. An example of a user interface input screen is shown in FIG. 5, and comprises fields shown at 117 to enter the aforementioned requirements 98. In addition, the user interface input screen includes graphical elements that allow adjustment of the weight to be applied to each performance category. The performance categories are shown at 118(1)-118(9). As shown in FIG. 5, examples of the plurality of performance categories are but not limited to: ability to commit memory to a virtual desktop interface session, clock rate per virtual machine (MHz/VM), number of virtual machines per processing core (VM/core), number of virtual machines per server computer (VM/Server), power usage per virtual machine (Watts/VM), cost per virtual machine (Cost/VM), amount of memory, e.g., Gigabytes per virtual machine (GB/VM), number of server computers required to satisfy expected workload requirements, CINT2006Rate per virtual machine (CINT/VM), CFP2006Rate per virtual machine (CFP/VM), and Blended CINT/CFP per virtual machine (Blend/VM). CINT2006Rate is the latest standard, as of the time of this writing, of SPECint, a computer benchmark specification for central processing unit (CPU) integer processing power. It is maintained by the Standard Performance Evaluation Corporation (SPEC). Similarly, CFP2006Rate is a benchmark specification for CPU floating point processing power. Blended CINT/CFP is a benchmark of a combination of CINT2006Rate and CFP2006Rate. Examples of other virtualization performance categories are network bandwidth (or input/output) requirements, storage bandwidth (or input/output) requirements, target hypervisor (vendor/product), and desktop virtualization software (vendor/product). For each performance category, there is a "slider" 119 that can be used to increase or decrease the weight or emphasis to be placed on a corresponding performance category. As explained herein, these weights are initially set to default values. Additionally, a "Reset Defaults" 150 button is shown; a "Rank Emphasis" arrow 157 is shown; and a series of view, graph and compare buttons 151(1) . . . 151(6) are shown.

At 120, using requirements 98 received at 115, a plurality of (the predetermined) virtualization computing equipment configurations that are capable of satisfying the requirements 98 are identified, including in some instances, configurations for multiple equipment vendors or manufacturers. Data describing one or more custom configurations may also be entered and considered for a set of requirements 98.

Figure 6:
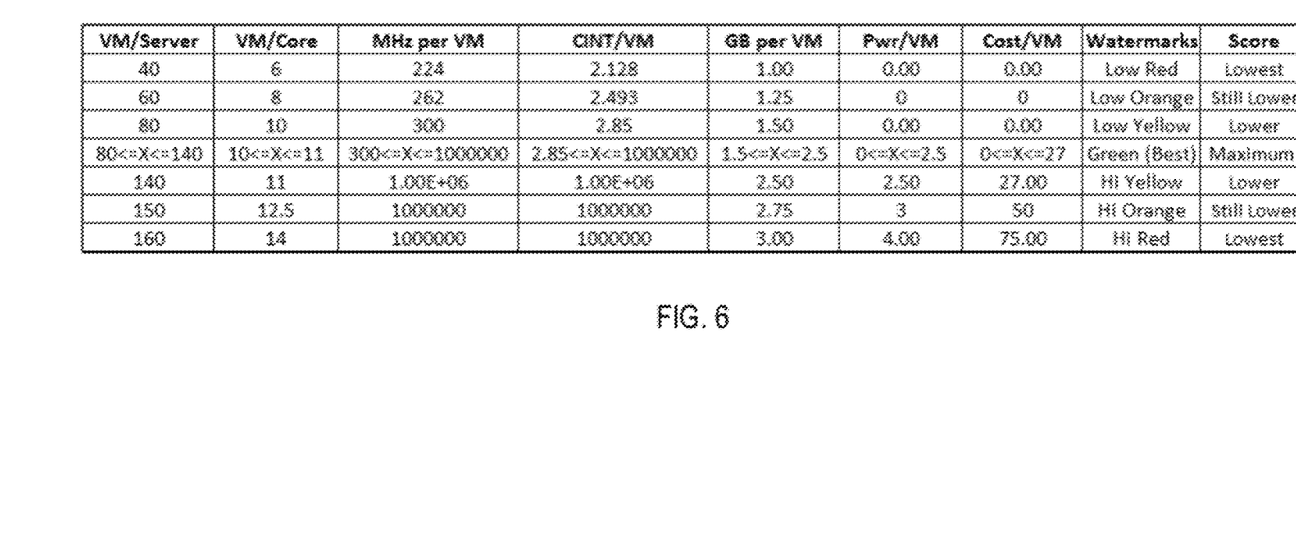
FIG. 6 is a diagram that depicts an example of the computation of efficiency measures for performance categories.

At 125, for each identified virtualization computing equipment configuration, a measure of efficiency is determined for each of the plurality of performance categories based on the requirements 98 and the performance test data. Examples of thresholds or watermarks for several performance categories are shown in FIG. 6. The measure of efficiency for a given performance category is determined based on one or more high threshold levels and/or one or more low threshold levels, i.e., thresholds, watermarks or values determined to indicate a good or bad performance measure (and relatively degrees of good or bad) for a given performance category. There may be ranges of values set for a performance category, such as a poor range, medium-good range, and bad range, both on the high and low end. As an example, for the performance category: available memory per virtual machine (GB/VM), the levels may be set:

Lowest (Red, meaning bad): 1
Still Lower (Orange, meaning poor): 1.25
Lower (Yellow, meaning not so good): 1.5
Good (Green, best score): 1.5<=X<=2.5
Hi (Yellow, meaning not so good) 2.5
Hi (Orange, meaning poor) 2.75
Hi (Red, meaning bad) 3.0

If a particular configuration has an available memory per virtual machine that falls within the "Good" range, then the efficiency measure score for this performance category for this particular configuration would be the maximum or best score available (based on the weight) for this category. For example, if the weight for the GB/VM performance category is 10% of the overall score (across all performance categories), then a 10 is assigned to the GB/VM performance category for this particular computing equipment configuration. If the weight for this performance category is adjusted higher or lower, then the same performance configuration would still be assigned the maximum score (according to its weight) if its GB/VM falls within the "Good" range. On the other hand, if the particular computing equipment configuration has a GB/VM of 1.25, then it would get an efficiency score lower than the maximum that could be allocated for this performance category, e.g., 5. A similar explanation applies to how the efficiency score is obtained for the other performance categories shown in FIG. 6. The efficiency scores are set based on an arbitrary overall percentage. For example, a total of 100 may be a perfect score across all the performance categories, or a total of 200 may be a perfect score across all the performance categories. For purposes of display, the different ranges and watermark levels may be color coded to assist a user in understanding the resulting output (as will become more apparent hereinafter in connection with FIGS. 7A and 7B.)

In general, some performance categories are measured with respect to multiple low watermarks, some are measured only against multiple high watermarks and still others are measured against both high and low thresholds. Additionally, some performance categories are measured on a percentage scale. In other words, the score for a particular performance category is based on where falls between the highest and lowest value rather than how it compares to certain high or low watermarks.

At 130, using the efficiency measure for the plurality of performance categories, a score is computed that represents the overall performance efficiency for each virtualization computing equipment configuration. The score generated at 130 is based on a weighting applied to corresponding performance categories, as mentioned above. In other words, the efficiency measure score for each performance category has a predetermined weight with respect to the overall score across all of the performance categories and computing the score that represents the overall performance efficiency is based weighting the efficiency measures (scores) for corresponding performance categories. The initial computation of the score for the plurality of virtualization computing equipment configurations may be based on default weights for the performance categories. At 135, the scores for each of the equipment configurations are displayed. Examples of displays of the equipment configurations are described hereinafter in connection with FIGS. 7A and 7B. At 140, a user may adjust the weighting applied to one or more performance categories using, but not limited, to a graphical element slider 119 for a particular performance category as shown in FIG. 5, and then the score is re-computed at 130. Examples of weight adjustments are described hereinafter in connection with FIGS. 8A and 8B.

Figure 7A:
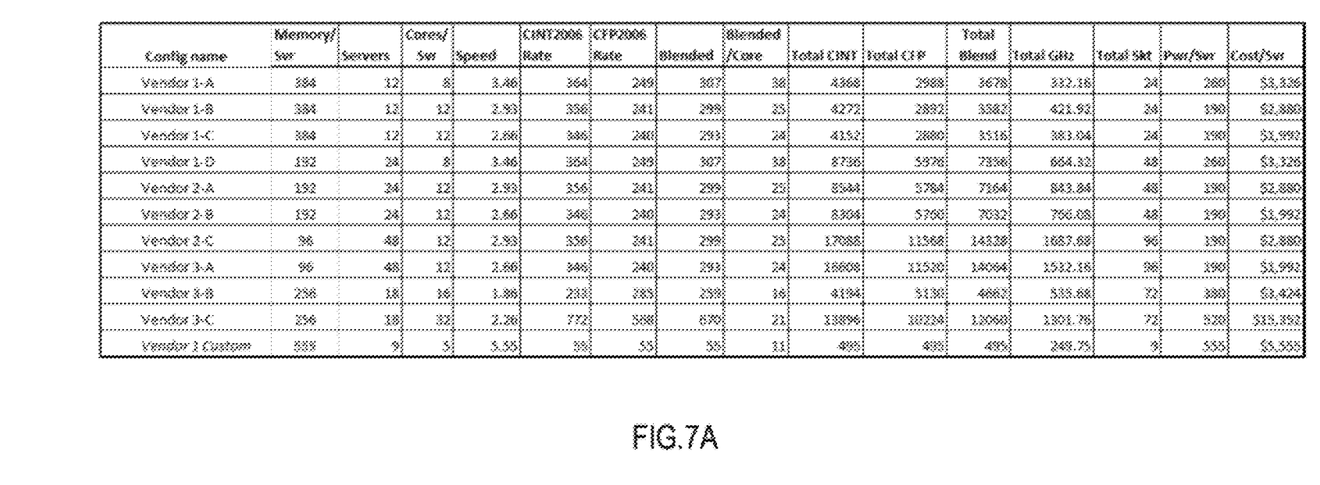
FIGS. 7A and 7B are diagrams that depict an example of displayed score/rank results for a plurality of computing equipment configurations.
Figure 7B:
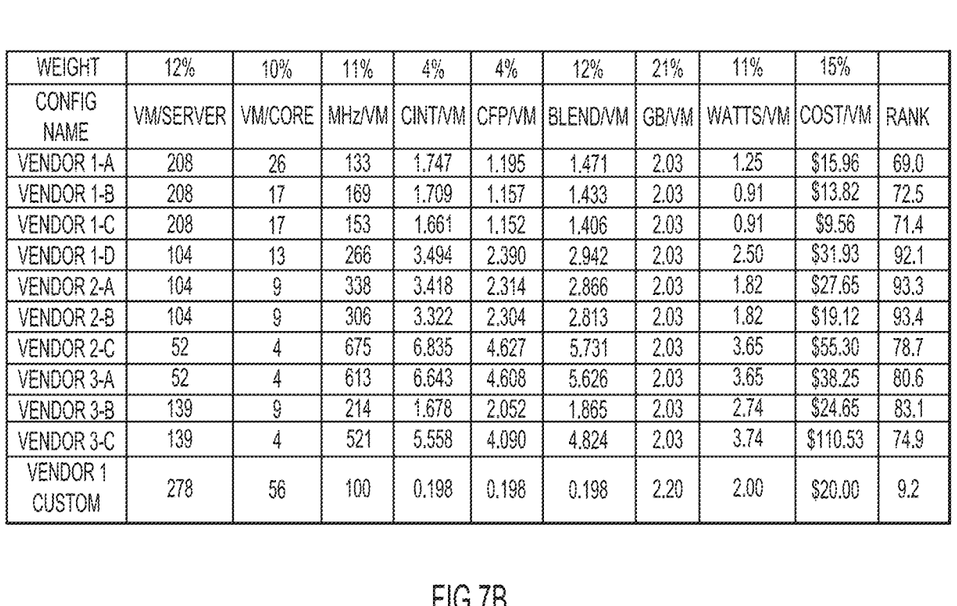

Reference is now made to FIGS. 7A and 7B for an example of the display of results of the resource comparison process 100. FIG. 7A shows the test data for a plurality of performance configurations for a plurality of virtualization computing equipment configurations. Each of a plurality of virtualization computing equipment configurations is represented by a row in FIG. 7A. There are predetermined computing equipment configurations shown for each of a plurality of vendors as well as a custom equipment configuration. The data for a given performance category may be color coded to visual indicate the measure in that performance category for a particular equipment configuration, where a particular color, such as green is meant to indicate a good measure and other colors, such as red, are meant to indicate a poor or bad measure.

FIG. 7B illustrates, for the same set of computing equipment configurations shown in FIG. 7A, the resulting overall scores/rankings. The score or rank computed for each configuration indicates how that configuration compares, across the plurality of performance categories, with respect to the other configurations. The top row in FIG. 7B shows the weights for the respective performance categories. In this example, 12% of the overall score is for the VM/Server performance category, 10% is for the VM/Core performance category, 11% is for the MHz/VM performance category, and so on. Also, in this example, the configuration with the highest overall score is the Vendor 2-B configuration with an overall score or ranking of 93.4. This means that for a particular set of requirements 98, the Vendor 2-B configuration would be the optimal computing equipment configuration according to the weights for the respective performance categories shown in FIG. 7B.

Figure 8A:
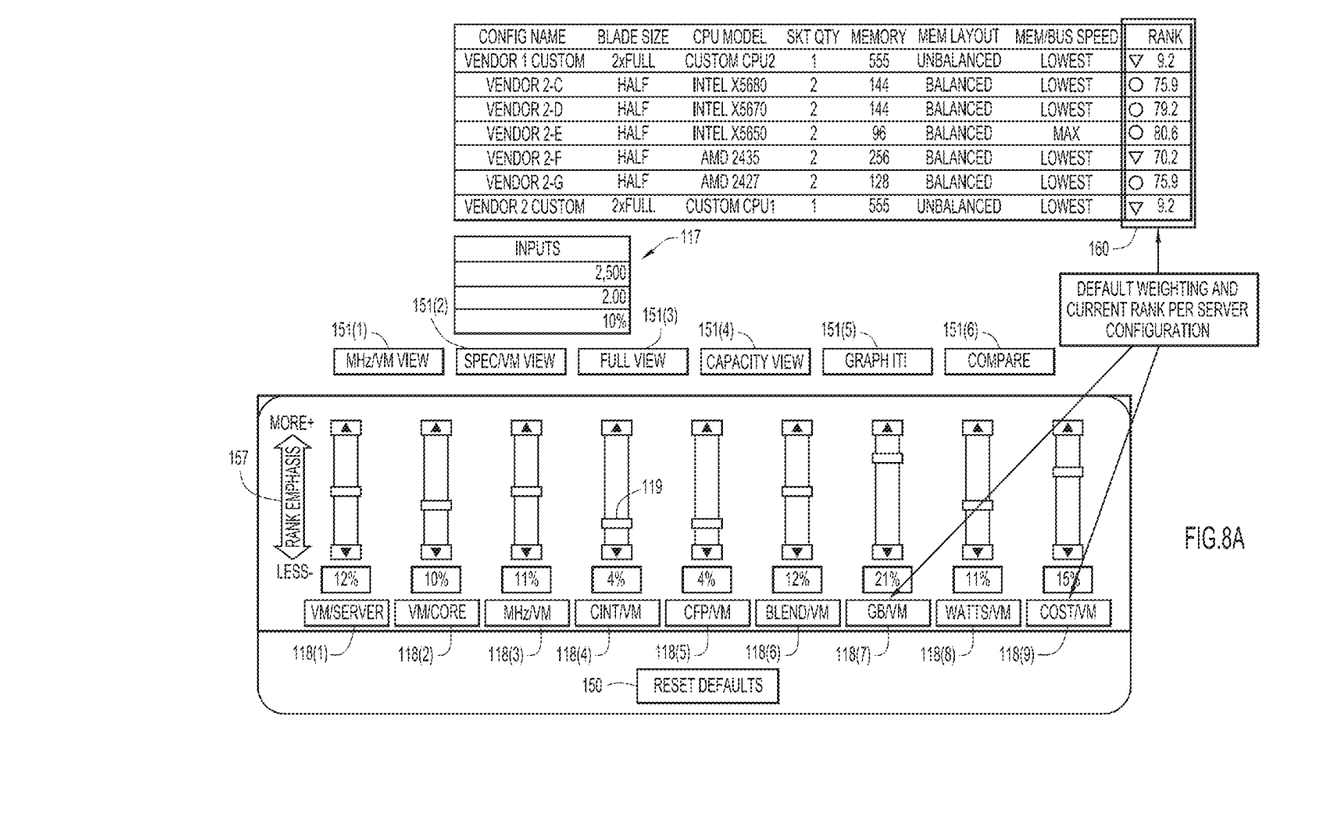
FIGS. 8A and 8B are diagrams illustrating an example of results for score/rank results for a plurality of computing equipment when a weight for a performance category is adjusted.
Figure 8B:
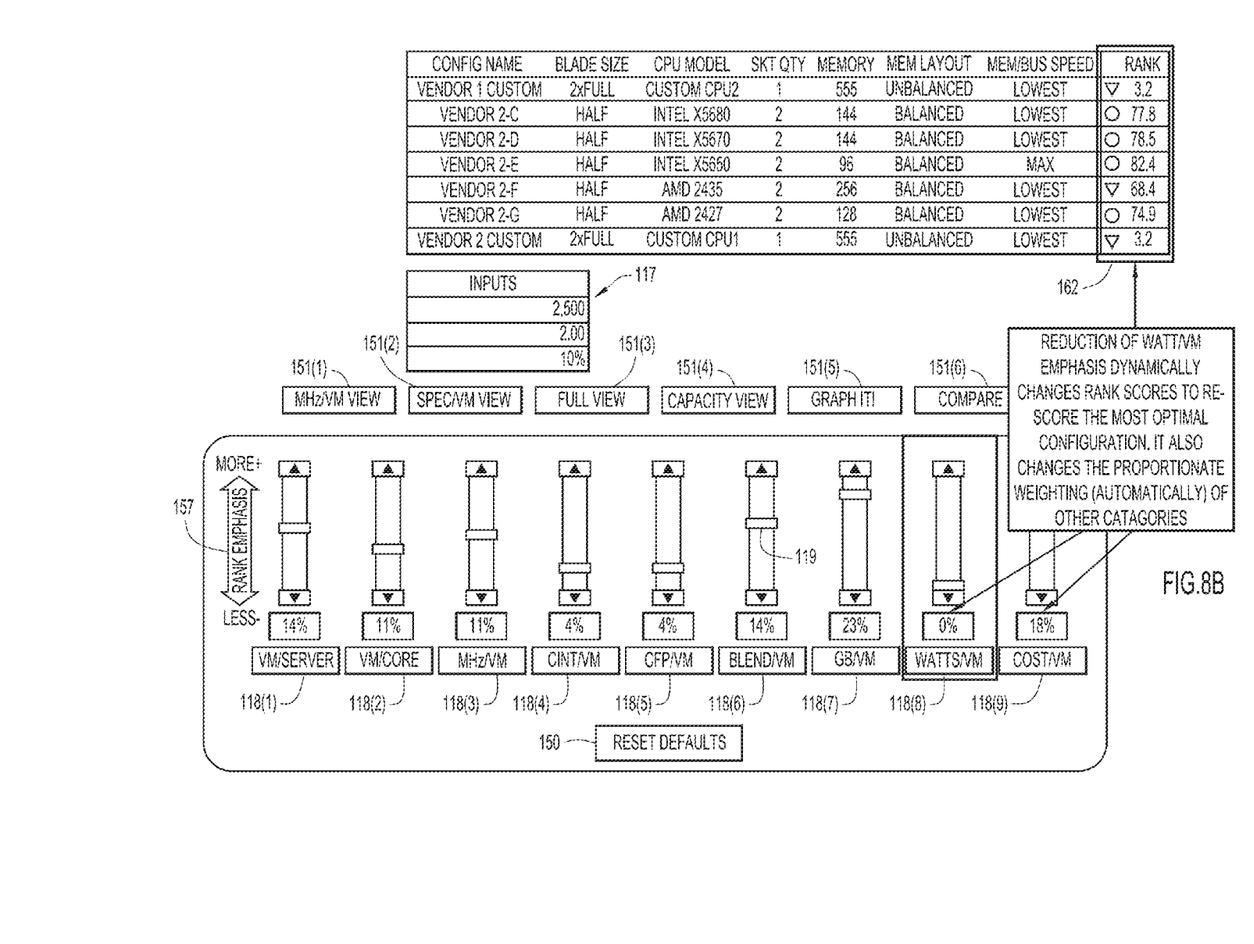

Turning now to FIGS. 8A and 8B, an example is shown of a user interface display screen that allows for adjustment of a weight for a particular performance category. The performance categories are shown at 118(1)-118(9) for both FIGS. 8A and 8B. FIG. 8A shows the rank or scores 160 for several equipment configurations when all of the performance categories are given a corresponding default weight. For each performance category in FIG. 8A, there is a "slider" 119 that can be used to increase or decrease the weight or emphasis to be placed on a corresponding performance category. Additionally, a "Reset Defaults" 150 button is shown; a "Rank Emphasis" arrow 157 is shown; and a series of view, graph and compare buttons 151(1) . . . 151(6) are shown. FIG. 8B shows the rank or scores 162 for the same equipment configurations shown in FIG. 8A after the Watt/VM performance category weight is adjusted to zero to essentially de-emphasize this particular performance category. In FIG. 8B, for each performance category, there is a "slider" 119 that can be used to increase or decrease the weight or emphasis to be placed on a corresponding performance category. Additionally, a "Reset Defaults" 150 button is shown; a "Rank Emphasis" arrow 157 is shown; and a series of view, graph and compare buttons 151(1) . . . 151(6) are shown. When a slider is moved to change the weight for a performance category, the score for each virtualization computing equipment configuration is automatically re-computed (in response to adjustment of one or more of the weights for one or more performance categories). The resulting scores for the equipment configurations after the Watt/VM performance category weight is adjusted are different as indicated in FIG. 8B. Also, by changing the weight of one performance category, the weights of the other performance categories are proportionately adjusted.

The resource comparison techniques described herein provide for a ranking/scoring mechanism that dynamically indicates an optimal hardware platform for a given set of virtualized computing requirements 98.

In sum, a method is provided comprising storing in a data storage unit performance test data of a plurality of virtualization computing equipment configurations for each of a plurality of virtualization computing performance categories; at a computing device, receiving data describing requirements for virtualization computing services; at the computing device, identifying virtualization computing equipment configurations among the plurality of virtualization computing equipment configurations that are capable of satisfying the requirements; determining for each identified virtualization computing equipment configuration, a measure of efficiency for each of the plurality of performance categories based on the requirements and the virtualization computing performance test data; and generating from the efficiency measure for the plurality of performance categories a score that represents the overall performance efficiency for each identified virtualization computing equipment configuration.

Similarly, an apparatus is provided comprising a data storage unit configured to store virtualization computing performance test data of a plurality of virtualization computing equipment configurations for each of a plurality of virtualization computing performance categories; and a processor configured to: receive data describing requirements for virtualization computing services; identify virtualization computing equipment configurations among the plurality of virtualization computing equipment configurations that are capable of satisfying the requirements; determine for each identified virtualization computing equipment configuration, a measure of efficiency in each of the plurality of performance categories based on the requirements and the virtualization computing performance test data; and generate from the efficiency measure for the plurality of performance categories a score that represents the overall performance efficiency for each identified virtualization computing equipment configuration.

Further still, in another form, provided herein is one or more computer readable storage media encoded with software comprising computer executable instructions and when the software is executed operable to: receive data describing requirements for virtualization computing services; identify virtualization computing equipment configurations among a plurality of virtualization computing equipment configurations that are capable of satisfying the requirements; determine for each identified virtualization computing equipment configuration, a measure of efficiency for each of the plurality of performance categories based on the requirements and virtualization computing performance test data of the identified virtualization computing equipment configurations in each of a plurality of virtualization computing performance categories; and generate from the efficiency measure for the plurality of performance categories a score that represents the overall performance efficiency for each identified virtualization computing equipment configuration.

The above description is intended by way of example only.

What is claimed is:

1. A method comprising:
    storing in a data storage unit performance test data for a plurality of physical servers comprising real test results obtained from observing physical server performance in each of a plurality of virtualization computing performance categories for each of a plurality of virtualization computing equipment configurations;
    at a computing device, receiving data describing a set of requirements for virtualization computing services for a computing hardware platform to be built, wherein the received data indicates a total number of virtual machine processes required corresponding to a number of instances of virtual desktop users or virtual servers, an amount of memory to be allocated for each instance, and a percentage of expected memory over-commitment, wherein memory over-commitment represents an amount of memory beyond what is physically provided by one or more physical servers for each instance;
    at the computing device, identifying virtualization computing equipment configurations among the plurality of virtualization computing equipment configurations from a plurality of hardware platforms that are capable of satisfying the set of requirements based upon the received data;
    determining for each identified virtualization computing equipment configuration, a measure of efficiency for each of the plurality of performance categories based on the set of requirements and the virtualization computing performance test data, wherein the measure of efficiency for a given performance category is based on one or more high threshold levels, one or more low threshold levels, or one or more high threshold and low threshold levels, with each threshold level corresponding to a particular score;
    weighting each measure of efficiency for a corresponding performance category;

generating an overall performance efficiency for each virtualization computing equipment configuration based upon a combination of weighted measures of efficiency; and ranking each identified virtualization computing equipment configuration based on the overall performance efficiency to indicate how a particular virtualization computing equipment configuration for a particular hardware platform compares to other virtualization computing equipment configurations for other hardware platforms, across the plurality of performance categories.

2. The method of claim 1, wherein storing further comprises storing in the data storage unit data representing capabilities of predetermined configurations of virtualization computing equipment, and wherein identifying further comprises identifying a plurality of predetermined virtualization computing equipment configurations that satisfy the set of requirements.

3. The method of claim 1, further comprising presenting a user interface input screen to adjust the weighting associated with one or more of the performance categories, and wherein generating comprises automatically re-computing the ranking for each of the virtualization computing equipment configurations in response to adjustment of the weighting for one or more of the performance categories.

4. The method of claim 1, further comprising displaying the ranking on a user input interface screen for each of the virtualization computing equipment configurations.

5. The method of claim 1, wherein the plurality of performance categories includes two or more of: ability to commit memory to a virtual desktop interface session, clock rate per virtual machine, number of virtual machines per processing core, number of virtual machines per server computer, power usage per virtual machine, cost per virtual machine, amount of memory per virtual machine, and number of server computers required to satisfy expected workload requirements, and at least one of the following: Integer Component of Standard Performance Evaluation Corporation Central Processing Unit 2006 Rates per virtual machine, Floating Point Component of Standard Performance Evaluation Corporation Central Processing Unit 2006 Rates per virtual machine, Integer Component/Floating Point Component of Standard Performance Evaluation Corporation Central Processing Unit 2006 Blend per virtual machine.

6. The method of claim 1, further comprising receiving data describing a custom virtualization computing equipment configuration, and wherein computing and generating are performed for the custom virtualization computing equipment configuration.

7. The method of claim 1, wherein the measure of efficiency for a first subset of performance categories is based on one or more high threshold levels and one or more low threshold levels, the measure of efficiency for a second subset of performance categories is based on one or more high threshold levels, and the measure of efficiency for a third subset of performance categories is based on one or more low threshold levels.

8. An apparatus comprising:
a data storage unit configured to store virtualization computing performance test data for a plurality of physical servers, wherein the test data comprises real test results obtained from observing physical server performance in each of a plurality of virtualization computing performance categories for each of a plurality of virtualization computing equipment configurations; and a processor configured to:
receive data describing a set of requirements for virtualization computing services for a computing hardware platform to be built;

identify virtualization computing equipment configurations among the plurality of virtualization computing equipment configurations from a plurality of hardware platforms that are capable of satisfying the set of requirements based on the received data, wherein the received data indicates a total number of virtual machine processes required corresponding to a number of instances of virtual desktop users or virtual servers, an amount of memory to be allocated for each instance, and a percentage of expected memory over-commitment, wherein memory over-commitment represents an amount of memory beyond what is physically provided by one or more physical servers for each instance;

compute for each identified virtualization computing equipment configuration, a measure of efficiency in each of the plurality of performance categories based on the set of requirements and the virtualization computing performance test data, wherein the measure of efficiency for a given performance category is based on one or more high threshold levels, one or more low threshold levels, or one or more high threshold and low threshold levels, with each threshold level corresponding to a particular score;

weight each measure of efficiency for a corresponding performance category;

generate an overall performance efficiency for each virtualization computing equipment configuration based upon a combination of weighted measures of efficiency; and rank each identified virtualization computing equipment configuration based on the overall performance efficiency to indicate how a particular virtualization computing equipment configuration for a particular hardware platform compares to other virtualization computing equipment configurations for other hardware platforms, across the plurality of performance categories.

9. The apparatus of claim 8, and further comprising a network interface unit configured to enable communications over a network for receiving the data describing the set of requirements.

10. The apparatus of claim 8, wherein the processor is configured to identify a plurality of predetermined virtualization computing equipment configurations that satisfy the set of requirements.

11. The apparatus of claim 8, wherein the processor is configured to present a user interface input screen to allow a user to adjust a weighting associated with one or more of the performance categories, and to automatically re-compute the ranking for each virtualization computing equipment configuration in response to adjustment of one or more of the weightings for one or more of the performance categories.

12. The apparatus of claim 8, wherein the measure of efficiency for a first subset of performance categories is based on one or more high threshold levels and one or more low threshold levels, the measure of efficiency for a second subset of performance categories is based on one or more high threshold levels, and the measure of efficiency for a third subset of performance categories is based on one or more low threshold levels.

13. One or more non-transitory computer readable storage media encoded with software comprising computer executable instructions and when the software is executed operable to:
- receive data describing a set of requirements for virtualization computing services for a computing hardware platform to be built, wherein the received data indicates a total number of virtual machine processes required corresponding to a number of instances of virtual desktop users or virtual servers, an amount of memory to be allocated for each instance, and a percentage of expected memory over-commitment, wherein memory over-commitment represents an amount of memory beyond what is physically provided by one or more physical servers for each instance;
- identify virtualization computing equipment configurations among a plurality of virtualization computing equipment configurations from a plurality of hardware platforms that are capable of satisfying the set of requirements based upon the received data;
- determine for each identified virtualization computing equipment configuration, a measure of efficiency for each of a plurality of performance categories based on the set of requirements and virtualization computing performance test data for a plurality of physical servers, wherein the test data comprises real test results obtained from observing physical server performance in each of a plurality of virtualization computing performance categories for each of a plurality of virtualization computing equipment configurations, wherein the measure of efficiency for a given performance category is based on one or more high threshold levels, one or more low threshold levels, or one or more high threshold and low threshold levels, with each threshold level corresponding to a particular score;
- weight each measure of efficiency for a corresponding performance category;
- generate an overall performance efficiency for each virtualization computing equipment configuration based upon a combination of weighted measures of efficiency; and
- rank each identified virtualization computing equipment configuration based on the overall performance efficiency to indicate how a particular virtualization computing equipment configuration for a particular hardware platform compares to other virtualization computing equipment configurations for other hardware platforms, across the plurality of performance categories.

14. The non-transitory computer readable storage media of claim 13, wherein the instructions that are operable to identify further comprise instructions operable to identify a plurality of predetermined virtualization computing equipment configurations that satisfy the set of requirements.

15. The non-transitory computer readable storage media of claim 13, and further comprising instructions that are operable to generate a user interface screen to allow a user to adjust a weighting associated with one or more of the performance categories, and to automatically re-compute the score ranking for each virtualization computing equipment configuration in response to adjustment of the weighting for one or more of the performance categories.

16. The non-transitory computer readable storage media of claim 13, and further comprising instructions operable to determine the measure of efficiency for a first subset of performance categories based on one or more high threshold levels and one or more low threshold levels, determine the measure of efficiency for a second subset of performance categories based on one or more high threshold levels, and determine the measure of efficiency for a third subset of performance categories based on one or more low threshold levels.

* * * * *

UNITED STATES PATENT AND TRADEMARK OFFICE
CERTIFICATE OF CORRECTION

PATENT NO. : 9,069,890 B2  
APPLICATION NO. : 13/090447  
DATED : June 30, 2015  
INVENTOR(S) : Kaiser et al.

Page 1 of 1

It is certified that error appears in the above-identified patent and that said Letters Patent is hereby corrected as shown below:

In Column 12, Line 22, delete "score".

Signed and Sealed this  
Fifth Day of July, 2016

Michelle K. Lee  
*Director of the United States Patent and Trademark Office*